United States Patent Office 3,072,058
Patented Jan. 8, 1963

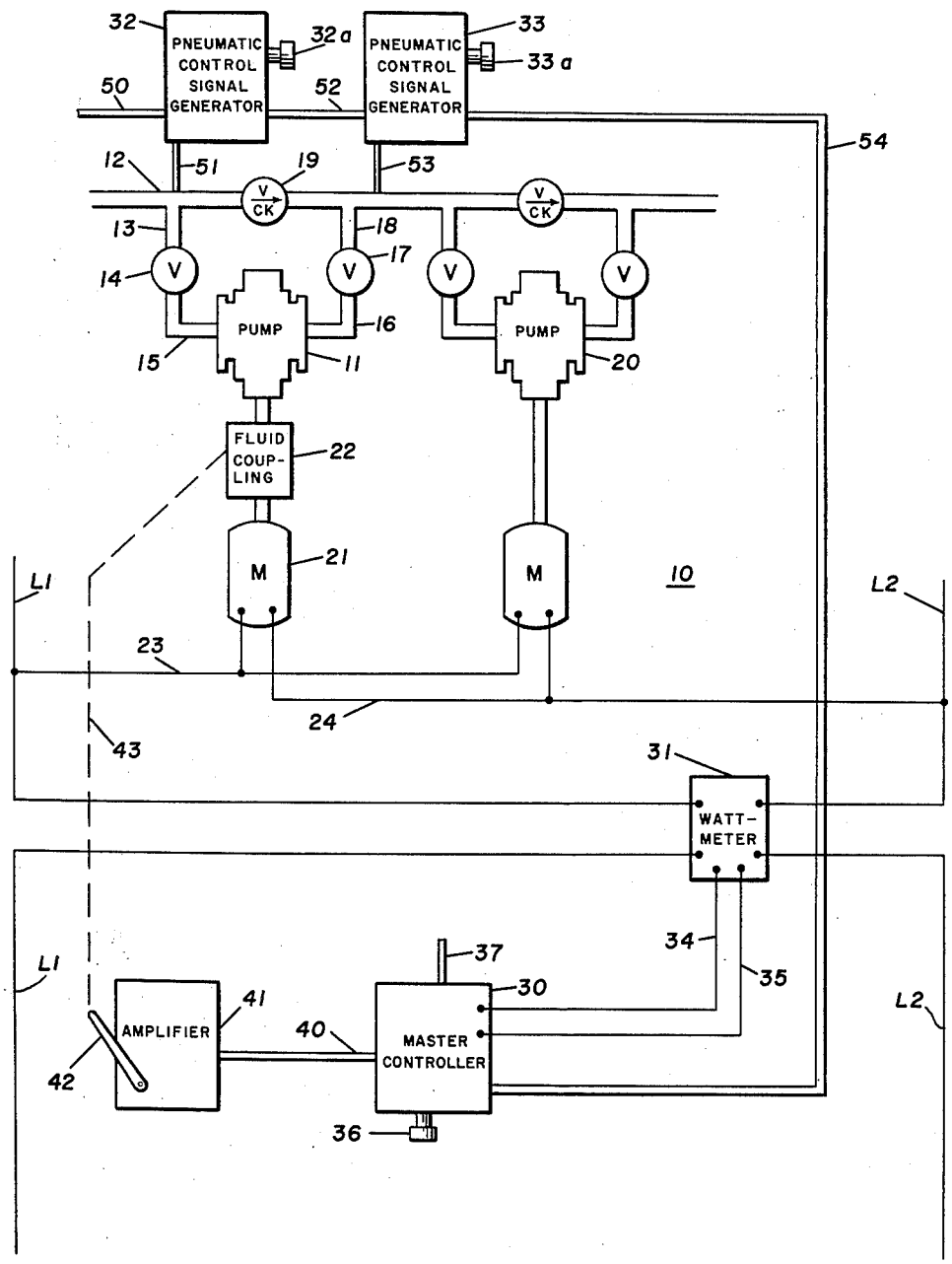

3,072,058
PIPE LINE CONTROL SYSTEM
Benjamin G. Christopher, Dallas, and George J. Dorris, Jr., Midland, Tex., assignors to Socony Mobil Oil Company, Inc., a corporation of New York
Filed Aug. 18, 1961, Ser. No. 132,458
7 Claims. (Cl. 103—12)

The present invention relates to control systems for pipe lines and more particularly to a system for controlling the operation of a pipe line pump station and has for an object the efficient operation of a pipe line pump station.

A typical pipe line pump station today includes one or more centrifugal pumps employed for boosting pipe line pressures along the length of the line. These pumps are usually driven by electric motors which may or may not be directly coupled to the pumps. In more recent developments, a variable coupling has been employed to transmit mechanical motion from the motor to the pump and the transmission, or coupling, employed to control the operation of the pump to maintain the suction pressure and the discharge pressure within predetermined limits. The above pressures are important to pump station operation, for too low a station suction pressure will cause damage to the pump and too high a discharge pressure may cause the rupture of the pipe line. Therefore, the maintenance of these pressures within predetermined limits has been the criterion of operating pipe line pump stations. So long as the pressures are maintained within the predetermined limits, the station is considered to be operating properly.

However, in recent times another problem has entered into the operation of pipe line pump stations and that has been the economic feature. The cost of power to operate the pump station, that is, the electrical power, is predicated upon two cost rates. One cost rate applies to the actual use of power and the second cost rate, a demand rate, is a fixed rate charge independent of actual total power used. Once a demand rate is established for a station the most economic operation of the station will be at a level that does not exceed the power consumption level determined by the demand rate. It can be readily appreciated that operation at a power consumption level below that which established the demand rate results in higher payment for power actually used. On the other hand, should the consumption increase to establish a higher demand rate, the customer will be penalized by charges at an increased rate for power consumed.

In accordance with a preferred embodiment of the present invention, there is provided a control system for a pipe line pumping station having at least one pump driven by an electric motor by way of a variable mechanical coupling. The control system includes a first control signal generator which responds to suction pressure on an input side of a pump for generating a first control signal. A second control signal generator responds to the pressure on a discharge side of the pump for modifying the first control signal in accordance with the magnitude of the discharge pressure to generate a second control signal. Control means responds to variations about a set point representative of a desired power consumption level or power demand level on the station for varying the degree of coupling between the motor and the pump to maintain the station power load at the power demand level. A means responsive to the second control signal varies the set point in accordance with deviations in the discharge and suction pressures from predetermined magnitudes to avoid damage to the station and to the pipe line.

The present invention therefore provides a system in which the station operating characteristics are initially determined by the power demand point or level, which point is subject to variations under control of existing pressures at the input and output sides of the pumping station. Thus, there is provided an efficient, economic operation of the pumping station while avoiding the possibility of physical injury to the station components and to the pipe line.

For other objects and advantages of the present invention, reference may be had to the following detailed description taken in conjunction with the accompanying drawing in which:

FIG. 1 schematically illustrates the control system of the present invention.

Referring now to FIG. 1, there is illustrated a control system 10 embodying the present invention and shown connected to control a pipe line pump station including a pump 11. The pump 11 is effective to increase the pressure of fluids flowing in the pipe line 12 by way of connections including the pipe 13, valve 14, and pipe 15 which connect an input or suction side of the pump 11 to the pipe line 12. An output or discharge side of the pump 11 is connected by way of pipe 16, valve 17, and pipe 18 to the pipe line 12. A check valve 19 is provided in the pipe line 12 between the suction and discharge ends of the pump 11 in a manner following usage well known in the art. While the invention will be described in conjunction with the control of pump 11, it will be understood that additional pumps may be connected in series further to boost the pressure of the fluid in the line 12. Such additional pumps are represented by the pump 20 connected in the pipe line 12 in a manner similar to that above described in conjunction with pump 11.

The pump 11 is driven by an electric motor 21 mechanically coupled to the pump by way of a variable coupling 22. The motor 21, usually of a substantially constant speed, induction type, derives its power by way of conductors 23 and 24 from a power line including conductors L1 and L2 by way of wattmeter 31.

As thus far described, the pump 11 is effective to regulate the discharge pressure and the suction pressure by variation in the magnitude of coupling between the motor and the pump. The variable coupling is preferred as a control means over a throttling valve for control of pressure since the latter predicates its operation upon a loss of energy within the valve itself to reduce pressure and thus amounts to less efficient operation of the power station from a power consumption standpoint.

In accordance with the present invention, the degree of coupling between the motor 21 and the pump 11 is primarily controlled in response to the power consumption level of the station. More particularly, the degree of coupling is primarily controlled so as to maintain the power consumed at a demand point. As previously set forth, such operation is desirable from an economic standpoint and to this end a controller 30 responsive to a power-sensing means 31 controls the degree of coupling between the motor 21 and the pump 11 so as to maintain the power consumed by the station at the demand point. Further, in accordance with the present invention, this primary function of control provided by controller 30 is overridden by control signal generators 32 and 33 responsive respectively to the suction pressure on an input side of the pump 11 and to the discharge pressure on an output side of the pump 11 to shift the point about which the controller operates and thus is effective to lower the power demand point of the station whenever the suction or discharge pressures exceed predetermined limits.

It will be recalled that the controller 30 is responsive to the power load on the station and effective to control the coupling between the motor 21 and the pump 11 to maintain the station power consumption at the demand point. To this end, the power-sensing means 31 may take the form of a wattmeter shown connected to the power lines L1 and L2 and having an output representative of the power consumed at the station applied by way of conductors 34 and 35 to an input of the controller 30. The controller 30 responds to the input signal from the wattmeter 31 to control the power consumption about a set point which represents the power demand point of the station as determined by the setting of a control knob 36. The output of the controller 30 is then active to vary the degree of coupling of the coupling device 22 to maintain the station at the demand point. More specifically, the controller 30 may be of the pneumatic type responsive to an electrical input signal to vary a pneumatic signal applied by way of tubing 40 to a mechanical amplifier 41. The mechanical amplifier 41 has an output lever 42 connected by way of mechanical linkage represented by the dotted lines 43 to a control of the variable coupling 22. Thus, there is provided, as well known in the art of controllers, a feedback loop effective to control the power consumed by the station. Supply air is provided to controller 30 from a source of constant pressure, for example, 15 pounds, and applied to the controller by way of conduit or tubing 37.

Now, no matter what the character of the fluid being shipped through the pipe line, that is, whether it be of low or high viscosity, the power consumption of the station will be regulated primarily so as to maintain operations about the selected demand point.

The primary control will be modified in accordance with the present invention to avoid damage to the pump station equipment upon deviation of selected parameters beyond predetermined limits. For example, should the downstream pressure increase, thereby to increase the suction pressure at the input side of the pump 11, there is a danger that the discharge pressure of the pump will reach an amplitude sufficient to rupture the pipe line 12. On the other hand, should the downstream pressure decrease below normal levels, the suction pressure on the pump 11 would fall below a safe value and may cause damage to the pump 11.

To avoid damage to the pipe line and station equipment and to assure operation within safe limits of suction and discharge pressure, there are provided the control signal generators 32 and 33 which are effective upon deviations of the aforementioned pressures from predetermined safe limits to vary the set point of the controller 30 as determined by positioning of the knob 36 to lower the set point and, thus, the demand point and thereby reduce the coupling between the motor 21 and the pump 11. This has the effect of slowing down the pump to permit the suction pressure to rise to or above a safe limit or to cause the discharge pressure to fall to or below a safe limit. The first control signal generator 32 has applied thereto from a source of supply air, which may be the same supply air as for controller 30, a predetermined level of input air as by way of conduit 50. In the preferred embodiment, this predetermined level of input air is set at a value such that if unmodified by the signal generators 32 and 33 it will maintain the set point established in the controller 30. The control signal generator 32 includes a pressure-sensing device (not shown) connected to the pipe line 12 by way of tubing 51. The output from the generator 32 is connected by way of tubing 52 to an input of the generator 33 whose pressure-sensing element (not shown) is connected by way of conduit 53 to the pipe line at a discharge side of the pump 11. The output signal from the generator 33 is applied by way of conduit 54 to the input of the controller 30.

Both the control signal generators 32 and 33 are designed such that if the pressures sensed by their respective sensing units are within the prescribed limits the supply air will be transmitted to the pipe, or tubing, 54 without modification. However, if either of the sensing units detects a variation pressure beyond the prescribed limits, the pressure, or supply line pressure in line 54, will be decreased; thus to lower the demand point for a period until the pressures have returned to the prescribed limits.

More particularly, the first control signal generator 32 generates a first control signal which under normal operating conditions, that is, with the suction pressure at the input of the pump 11 at or above a predetermined value, is equal to that of the input supply pressure. A decrease in the suction pressure at the input of the pump 11 will cause the signal generator 32 to decrease its output pressure below the pressure of the input air. The predetermined level of suction pressure at which the signal generator 32 will begin to decrease the pressure of the air transmitted to the second signal generator 33 may be set into the first signal generator by way of control knob 32a.

The second signal generator 33 has a similar control knob 33a which determines the upper limit of pressure for the discharge side of the pump 11. So long as the discharge pressure is at or below the predetermined level set into the signal generator, the signal generator will transmit to the tubing 54, without modification, the output air from the signal generator 32. Should the discharge pressure exceed the predetermined level, the signal generator will now modify the air applied from the first signal generator, lowering it to a new value which will in turn lower the set point on the master controller 30 to cause a reduction in coupling between the motor 21 and the pump 11 until the discharge pressure has been reduced to the preset value.

While the signal generator 33 has been illustrated having its detector connected to the discharge side of pump 11, it will be understood that the detector may be connected at the discharge side of the pump 20. When referring to the detection of the discharge pressure at the output side of the pump, the phrase is meant to include any point which lies to the discharge side of the pump being controlled, and this may include a point at the discharge end of the pump station.

While the invention has been disclosed in conjunction with a fluid-type coupling between the motor 21 and the pump 11 in order to control the discharge and suction pressures, it will be understood that the gate valve 17 may be replaced by a throttling valve and that the setting of the throttling valve may be varied in response to the output from the mechanical amplifier 41 to change the discharge pressure on the output side of the pump.

The signal generating units 32 and 33 may be pneumatic controllers which are well known in the art. For example, in one embodiment of the invention now in operation, the signal generators were of the type available from the Mason-Neilan Company of Norwood, Massachusetts, and identified as Model 62115, described in the Catalog No. 208, dated February 1960.

The master controller 30 on the other hand may in the preferred embodiment take the form of the Minneapolis-Honeywell Regulator Company's Pneumatic Controller with Variable Indexet Type 152, Air-O-Line Pneumatic Control System.

The mechanical amplifier 41 may be of the type available from the Bailey Meter Company and identified as a Bailey Control Drive, Type AC44.

The variable coupling 22 may be of any one of several well-known types. In the embodiment now in the field, there is employed a variable coupling available from American Standard Company and known as the Gyrol Fluid Drive. In such units, the degree of coupling is controlled by the mechanical positioning of a scoop tube. The scoop tube is located in the recirculating path of the liquid within the coupling unit. The scoop tube, or return path, is provided with a larger capacity than the input capacity to the unit. Therefore, by raising or lowering the scoop tube within the unit, there is controlled the amount of liquid within the unit and hence the degree of coupling provided by the unit.

More particularly, the position of the scoop tube determines the amount of fluid between the driving and the driven elements to control the output speed of the coupling unit. As the scoop tube is moved toward the outer periphery of the rotating elements, the fluid volume becomes smaller within the coupling unit and therefore its output speed is reduced, causing a reduction in the speed of the centrifugal pump to which it is attached.

Now that one embodiment of the invention has been described, other modifications and embodiments will become apparent to those skilled in the art; and it is intended to cover such embodiments and modifications as fall within the scope of the appended claims.

What is claimed is:

1. A pumping station including at least one pump having associated therewith an input side and a discharge side, an electric motor, a variable mechanical coupling interconnecting said motor and said pump, a first control signal generator responsive to suction pressure on said input side for generating a first control signal, a second control signal generator responsive to the pressure on said discharge side for modifying said first control signal in accordance with the magnitude of the discharge pressure to generate a second control signal, control means responsive to variations about a set point representative of a desired power demand point on said station for varying the degree of coupling between said motor and said pump to operate said station at the demand point, and means responsive to said second control signal to vary the set point in accordance with deviations in said discharge and suction pressures from predetermined magnitudes.

2. A pumping station including at least one pump having associated therewith an input side and a discharge side, an electric motor, a variable mechanical coupling interconnecting said motor and said pump, a first control signal generator responsive to suction pressure on said input side for generating a first pneumatic control signal, a second control signal generator responsive to the pressure on said discharge side for modifying said first control signal in accordance with the magnitude of the discharge pressure to generate a second pneumatic control signal, control means responsive to variations about a set point representative of the desired power demand point on said station for varying the degree of coupling between said motor and said pump to operate said station at the demand point, and means responsive to said second control signal to vary the set point in accordance with deviations in said discharge and suction pressures from predetermined magnitudes.

3. A pumping station including at least one pump having associated therewith an input side and a discharge side, an electric motor, a variable mechanical coupling interconnecting said motor and said pump, a first control signal generator having an input side and responsive to suction pressure on said input side for generating a first pneumatic control signal, means for applying air of constant pressure to said input of said first signal generator, a second control signal generator having an input, means for applying said first pneumatic control signal to said input of said second control signal generator, said second control signal generator being responsive to the pressure on said discharge side for modifying said first control signal in accordance with the magnitude of the discharge pressure to generate a second pneumatic control signal, control means responsive to variations about a set point representative of the desired power demand point on said station for varying the degree of coupling between said motor and said pump to operate said station at the demand point, and means responsive to said second signal to lower the set point in accordance with an increase in said discharge pressure or a decrease in said suction pressure from predetermined magnitudes.

4. A pumping station including at least one pump having associated therewith an input side and an output side, an electric motor, a variable coupling interconnecting said pump and said motor, a first control signal generator responsive to suction pressure on said input side for generating a first control signal, a second control signal generator responsive to the pressure on said discharge side for modifying said first control signal in accordance with the magnitude of the discharge pressure to generate a second control signal, means for measuring electrical power to said station for producing a signal representative of the power load of said station, means for establishing a set point representative of the desired power demand point on the station, control means responsive to variations about said set point of said signal representative of the power load of said station for varying the degree of coupling between said motor and said pump to operate said station at the demand point, and means responsive to said second signal to vary the set point in accordance with deviations in said discharge and suction pressures from predetermined magnitudes.

5. A pumping station including at least one pump having associated therewith an input side and a discharge side, an electric motor, a variable mechanical coupling interconnecting said motor and said pump, a first control signal generator responsive to suction pressure on said input side, a second control signal generator responsive to discharge pressure on said discharge side, said first and said second control signal generators being interconnected to generate a control signal representative of the condition of said pressures on said suction side and on said discharge side, control means responsive to variations about a set point representative of a desired power demand point on said station for varying the degree of coupling between said motor and said pump to operate said station at the demand point, and means responsive to said control signal to vary the set point in accordance with deviations in said discharge and suction pressures from predetermined magnitudes.

6. A pumping station as in claim 5 in which one of said generators produces a control signal which is modified by the other of said generators in accordance with deviations from a predetermined magnitude of pressure to which said other of said generators responds to produce said control signal to which said last-named means responds.

7. A pumping station including at least one pump having associated therewith an input side and a discharge side, an electric motor, a variable mechanical coupling interconnecting said motor and said pump, a first control signal generator having an input side and an output side and responsive to suction pressure on said input side associated with said pump for generating a first control signal, a second control signal generator having an input side and an output side and responsive to pressure on said discharge side associated with said pump to generate a second control signal, means interconnecting the output side of said first signal generator with the input side of said second signal generator for modification of said first control signal by said second control signal generator in accordance with deviation of said discharge pressure from a predetermined magnitude, control means responsive to variations about a set point representative of the desired demand point on said station for varying the degree of coupling between said motor and said pump to operate said station at the demand point, and means responsive to said second control signal to vary the set point in accordance with deviations in said discharge and said suction pressures from predetermined magnitudes.

References Cited in the file of this patent

UNITED STATES PATENTS

| | | |
|---|---|---|
| 1,977,737 | Needham | Oct. 23, 1934 |
| 1,997,476 | Wallene | Apr. 9, 1935 |
| 2,539,430 | Jepson | Jan. 30, 1951 |
| 3,007,414 | Long | Nov. 7, 1961 |